US009276986B2

(12) United States Patent
Mika et al.

(10) Patent No.: US 9,276,986 B2
(45) Date of Patent: Mar. 1, 2016

(54) SYSTEMS, METHODS, AND APPARATUSES FOR FACILITATING REMOTE DATA PROCESSING

(75) Inventors: Pesonen Mika, Tampere (FI); Eero Aho, Tampere (FI); Jari Nikara, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 1484 days.

(21) Appl. No.: 12/768,288

(22) Filed: Apr. 27, 2010

(65) Prior Publication Data

US 2011/0264761 A1    Oct. 27, 2011

(51) Int. Cl.
*G06F 15/16* (2006.01)
*H04L 29/06* (2006.01)
*H04L 29/08* (2006.01)

(52) U.S. Cl.
CPC .............. *H04L 65/80* (2013.01); *H04L 65/605* (2013.01); *H04L 67/2828* (2013.01); *H04L 69/04* (2013.01)

(58) Field of Classification Search
CPC ... H04L 69/04; H04L 65/605; H04L 67/2828; G06F 3/048
USPC ................................................. 709/200, 217
See application file for complete search history.

(56) References Cited

U.S. PATENT DOCUMENTS

| | | | |
|---|---|---|---|
| 5,446,740 A | 8/1995 | Yien et al. | |
| 5,568,489 A | 10/1996 | Yien et al. | |
| 6,614,544 B2 * | 9/2003 | Tokura | H04N 1/3333 358/1.14 |
| 7,110,664 B2 * | 9/2006 | Yogeshwar | H04N 5/76 386/328 |
| 7,523,505 B2 * | 4/2009 | Menschik | G06F 19/322 705/3 |
| 7,668,680 B2 * | 2/2010 | Manfredi | G06F 11/2221 702/108 |
| 8,135,263 B2 * | 3/2012 | Yogeshwar et al. | 386/326 |
| 8,229,873 B1 * | 7/2012 | Dolan | G06Q 30/00 706/45 |
| 2002/0002468 A1 | 1/2002 | Spagna et al. | |
| 2002/0131651 A1 * | 9/2002 | Anantharamu | G06T 3/40 382/284 |
| 2003/0061369 A1 * | 3/2003 | Aksu | H04L 29/06027 709/231 |
| 2003/0174228 A1 * | 9/2003 | Brake | H04N 1/0044 348/333.11 |
| 2004/0042506 A1 | 3/2004 | Fallon et al. | |
| 2005/0149557 A1 * | 7/2005 | Moriya | G06F 17/30802 |
| 2005/0159643 A1 * | 7/2005 | Zinaty | A61B 1/041 600/109 |
| 2006/0047634 A1 * | 3/2006 | Aaron | G06F 17/30867 |
| 2007/0047659 A1 * | 3/2007 | Aleksic | H04N 19/40 375/240.25 |

(Continued)

FOREIGN PATENT DOCUMENTS

CN     101834894 A       9/2010
EP     1526744 A1 *      4/2005 ............... H04Q 7/18

(Continued)

OTHER PUBLICATIONS

International Search Report and Written Opinion for Application No. PCT/IB2011/051830 dated Aug. 17, 2011.

(Continued)

*Primary Examiner* — Anthony Mejia
(74) *Attorney, Agent, or Firm* — Alston & Bird LLP

(57) ABSTRACT

Methods and apparatuses are provided for facilitating remote data processing. A method may include accessing content represented by data having a first size. The method may further include preprocessing the data to generate reduced data having a second size being smaller than the first size. The method may additionally include causing the reduced data to be sent to a remote data processing apparatus configured to process the reduced data to derive data related to the content. Corresponding apparatuses are also provided.

28 Claims, 10 Drawing Sheets

(56) References Cited

U.S. PATENT DOCUMENTS

| | | | | | |
|---|---|---|---|---|---|
| 2007/0255851 | A1* | 11/2007 | Vrba | ........................ | H03M 7/30 709/246 |
| 2008/0028083 | A1* | 1/2008 | Rezvani | .................. | H04L 47/10 709/229 |
| 2008/0155058 | A1* | 6/2008 | Prasad | ................ | H04L 67/1095 709/218 |
| 2008/0240235 | A1* | 10/2008 | Holcomb | ............. | H04N 19/176 375/240.03 |
| 2009/0193055 | A1* | 7/2009 | Kuberka | .............. | G06F 17/3028 |
| 2010/0045594 | A1* | 2/2010 | Jenks | ........................ | H04N 9/12 345/156 |
| 2010/0048242 | A1 | 2/2010 | Rhodes et al. | | |
| 2010/0104025 | A1* | 4/2010 | Rose | ..................... | H04N 21/234 375/240.27 |
| 2010/0131827 | A1* | 5/2010 | Sokolov | .............. | G06F 11/1072 714/763 |
| 2010/0185598 | A1* | 7/2010 | Saarelma | .......... | G06F 17/30876 707/705 |
| 2010/0205203 | A1* | 8/2010 | Anderson | ............ | G06F 17/3079 707/769 |
| 2010/0260426 | A1* | 10/2010 | Huang | .............. | G06F 17/30247 382/218 |
| 2010/0309975 | A1* | 12/2010 | Zhou | ....................... | H04N 5/772 375/240.03 |
| 2011/0055678 | A1* | 3/2011 | Ramsey | .................... | G06F 8/30 715/202 |
| 2011/0081948 | A1* | 4/2011 | Shirai | ...................... | G06T 11/60 455/556.2 |
| 2011/0113453 | A1* | 5/2011 | Ralston | .................. | H03M 7/40 725/62 |
| 2011/0157298 | A1* | 6/2011 | Huang | ..................... | H04N 7/15 348/14.08 |
| 2011/0211726 | A1* | 9/2011 | Moed | ................. | G06K 9/00986 382/100 |
| 2011/0264676 | A1* | 10/2011 | Belan | ................ | G06F 17/30784 707/756 |
| 2011/0276863 | A1* | 11/2011 | Bhise | ................ | G06F 17/30905 715/201 |
| 2012/0062732 | A1* | 3/2012 | Marman | ................... | H04N 7/18 348/142 |
| 2012/0212631 | A1* | 8/2012 | Klirenko | .............. | A61B 5/0059 348/207.1 |
| 2012/0233654 | A1* | 9/2012 | McDonald | ......... | H04N 7/17318 725/116 |
| 2013/0028467 | A9* | 1/2013 | Millar | ................ | G06K 9/00771 382/103 |
| 2013/0242119 | A1* | 9/2013 | Ralston et al. | ............. | 348/207.1 |

FOREIGN PATENT DOCUMENTS

| | | |
|---|---|---|
| WO | WO 95/17067 A1 | 6/1995 |
| WO | WO 01/31497 A1 | 5/2001 |
| WO | WO 03/027876 A1 | 4/2003 |

OTHER PUBLICATIONS

"Pocket Supercomputer,"—Strategy—Future Tech—Builder AU; Thin Client Phone Becomes Pocket SuperComputer; http://www.builderau.com.au/strategy/futuretech/soa/Thin-client-phone-becomes-Pocket-Supercomputer-/0.339028285.339285529.00.htm; Feb. 23, 2010.

Supplementary European Search Report for Application No. EP 11 77 4515 dated Dec. 8, 2014.

* cited by examiner

US 9,276,986 B2

SYSTEMS, METHODS, AND APPARATUSES FOR FACILITATING REMOTE DATA PROCESSING

TECHNOLOGICAL FIELD

Embodiments of the present invention relate generally to data processing technology and, more particularly, relate to systems, methods, and apparatuses for reducing data size to enable remote processing of the reduced data.

BACKGROUND

The modern computing era has brought about a tremendous expansion in computing power as well as increased affordability of computing devices. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor are becoming increasingly ubiquitous and are used for a wide variety of purposes.

For example, many mobile computing devices now have built in digital cameras capable of capturing high quality multimedia content. Given the convenience of portable devices capable of capturing media content, many users now have large content libraries. In this regard, the quantity and the variety of digital content captured and stored by computing devices has greatly increased in recent years and is expected to continue to dramatically increase in the years to come.

BRIEF SUMMARY

Systems, methods, apparatuses, and computer program products described herein facilitate remote data processing. The systems, methods, apparatuses, and computer program products provided in accordance with example embodiments of the invention may provide several advantages to computing devices and computing device users. Some example embodiments provide for remote data processing. In this regard, some example embodiments facilitate remote data processing of data content such that information about the content may be mined from the content. In this regard data representing content may be sent to a data processing apparatus that is remote from a device capturing the content. Accordingly, potentially burdensome processing of the data may be offloaded to an apparatus specially configured to process data rather than requiring the data processing to be performed at a user's device, which may have relatively limited processing capabilities. Some example embodiments provide for reduction of data size prior to transferring the data to a data processing apparatus. Accordingly, any burden imposed on network resources by transfer of data for remote processing may be reduced as less throughput is required to transfer data having a reduced size. Additionally, hardware and/or software configured for data processing may be centralized at a single location and leveraged by a plurality of users rather than requiring each user to have specially configured hardware and/or software on their own computing device.

Some example embodiments facilitate remote generation of metadata that may provide information about content and facilitate organization, distribution, and usage of the content. Some example embodiments additionally or alternatively provide for remote processing of data representing content to identify objects contained within the content. For example, such example embodiments may provide for remote data processing to identify a face or other object depicted in an image defined by the content.

In a first example embodiment, a method is provided, which comprises accessing content represented by data having a first size. The method of this embodiment further comprises preprocessing the data to generate reduced data having a second size being smaller than the first size. The method of this embodiment additionally comprises causing the reduced data to be sent to a remote data processing apparatus configured to process the reduced data to derive data related to the content.

In another example embodiment, an apparatus is provided. The apparatus of this embodiment comprises at least one processor and at least one memory storing computer program code, wherein the at least one memory and stored computer program code are configured, with the at least one processor, to cause the apparatus to at least access content represented by data having a first size. The at least one memory and stored computer program code are configured, with the at least one processor, to further cause the apparatus of this embodiment to preprocess the data to generate reduced data having a second size being smaller than the first size. The at least one memory and stored computer program code are configured, with the at least one processor, to additionally cause the apparatus of this embodiment to cause the reduced data to be sent to a remote data processing apparatus configured to process the reduced data to derive data related to the content.

In another example embodiment, a computer program product is provided. The computer program product of this embodiment includes at least one computer-readable storage medium having computer-readable program instructions stored therein. The program instructions of this embodiment comprise program instructions configured to access content represented by data having a first size. The program instructions of this embodiment further comprise program instructions configured to preprocess the data to generate reduced data having a second size being smaller than the first size. The program instructions of this embodiment also comprise program instructions configured to cause the reduced data to be sent to a remote data processing apparatus configured to process the reduced data to derive data related to the content.

In another example embodiment, an apparatus is provided that comprises means for accessing content represented by data having a first size. The apparatus of this embodiment further comprises means for preprocessing the data to generate reduced data having a second size being smaller than the first size. The apparatus of this embodiment additionally comprises means for causing the reduced data to be sent to a remote data processing apparatus configured to process the reduced data to derive data related to the content.

In another example embodiment, a method is provided, which comprises receiving reduced data representative of content. The reduced data of this embodiment comprises data generated by a remote terminal apparatus by preprocessing data having a larger size than the reduced data. The method of this embodiment further comprises processing the reduced data to derive data related to the content.

In another example embodiment, an apparatus is provided. The apparatus of this embodiment comprises at least one processor and at least one memory storing computer program code, wherein the at least one memory and stored computer program code are configured, with the at least one processor, to cause the apparatus to at least receive reduced data representative of content. The reduced data of this embodiment comprises data generated by a remote terminal apparatus by preprocessing data having a larger size than the reduced data. The at least one memory and stored computer program code are configured, with the at least one processor, to further cause the apparatus of this embodiment to process the reduced data to derive data related to the content.

In another example embodiment, a computer program product is provided. The computer program product of this embodiment includes at least one computer-readable storage medium having computer-readable program instructions stored therein. The program instructions of this embodiment comprise program instructions configured to receive reduced data representative of content. The reduced data of this embodiment comprises data generated by a remote terminal apparatus by preprocessing data having a larger size than the reduced data. The program instructions of this embodiment further comprise program instructions configured to process the reduced data to derive data related to the content.

In another example embodiment, an apparatus is provided that comprises means for receiving reduced data representative of content. The reduced data of this embodiment comprises data generated by a remote terminal apparatus by preprocessing data having a larger size than the reduced data. The apparatus of this embodiment further comprises means for processing the reduced data to derive data related to the content.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
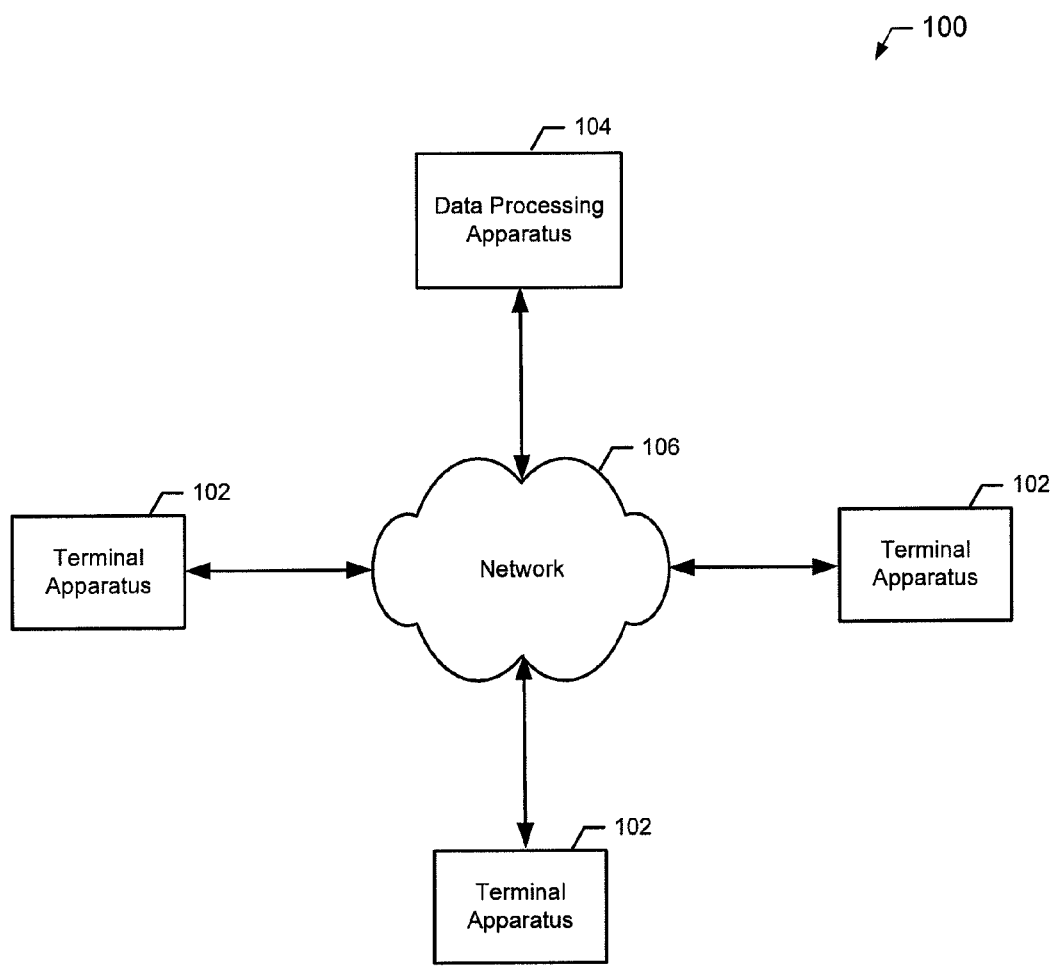
FIG. 1 illustrates a block diagram of a system for facilitating remote data processing according to an example embodiment of the invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Human senses often demand a large amount of data to represent content to enable the content to appear to human senses to be of high quality. However, this data amount does not contain human observable associative information (e.g., metadata) about the content itself. In this regard, metadata often needs to be generated after capturing the content and/or in a process separate from capture of the content. Data processing (e.g., data mining) is one technique to create metadata. However, data processing is a computationally intensive process that may surpass or at least push the limits of the computational capabilities of many mobile computing devices.

Remote data processing by a dedicated data processing apparatus as provided by example embodiments of the invention may accordingly reduce the computational impact of data analysis for deriving data related to content, such as for example, generation of metadata related to the content, on mobile and other computing devices on which content is captured or otherwise stored. In this regard, example embodiments provide terminal apparatuses configured to transfer data to a remote data processing apparatus for processing to derive data related to the content. Transfer of the amount of data used to represent high quality (e.g., high definition) content may, however, impose burdens on networks. In many cases, however, generation of metadata and other data processing requires less data than that required to represent high quality content. Accordingly, some example embodiments facilitate remote data processing by reducing data size by preprocessing the data prior to transmitting the data to a remote data processing apparatus.

Referring now to FIG. 1, FIG. 1 illustrates a block diagram of a system 100 for facilitating remote data processing according to an example embodiment of the present invention. It will be appreciated that the system 100 as well as the illustrations in other figures are each provided as an example of one embodiment of the invention and should not be construed to narrow the scope or spirit of the invention in any way. In this regard, the scope of the disclosure encompasses many potential embodiments in addition to those illustrated and described herein. As such, while FIG. 1 illustrates one example of a configuration of a system for facilitating remote data processing, numerous other configurations may also be used to implement embodiments of the present invention.

In at least some embodiments, the system 100 includes a data processing apparatus 104 and one or more terminal apparatuses 102. The data processing apparatus 104 may be in communication with one or more terminal apparatuses 102 over the network 106. The network 106 may comprise a wireless network (e.g., a cellular network, wireless local area network, wireless personal area network, wireless metropolitan area network, and/or the like), a wireline network, or some combination thereof, and in some embodiments comprises at least a portion of the internet.

The data processing apparatus 104 may be embodied as one or more servers, one or more desktop computers, one or more laptop computers, one or more mobile computers, one or more network nodes, multiple computing devices in communication with each other, any combination thereof, and/or the like. In this regard, the data processing apparatus 104 may comprise any computing device or plurality of computing devices configured to provide remote data processing services to one or more terminal apparatuses 102 over the network 106 as described herein.

A terminal apparatus 102 may be embodied as any computing device, such as, for example, a desktop computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), any combination thereof, and/or the like. In this regard, the terminal apparatus 102 may be embodied as any computing device configured to provide data representing content to a data processing apparatus 104 for remote processing of the data, as will be described further herein below.

Figure 2:
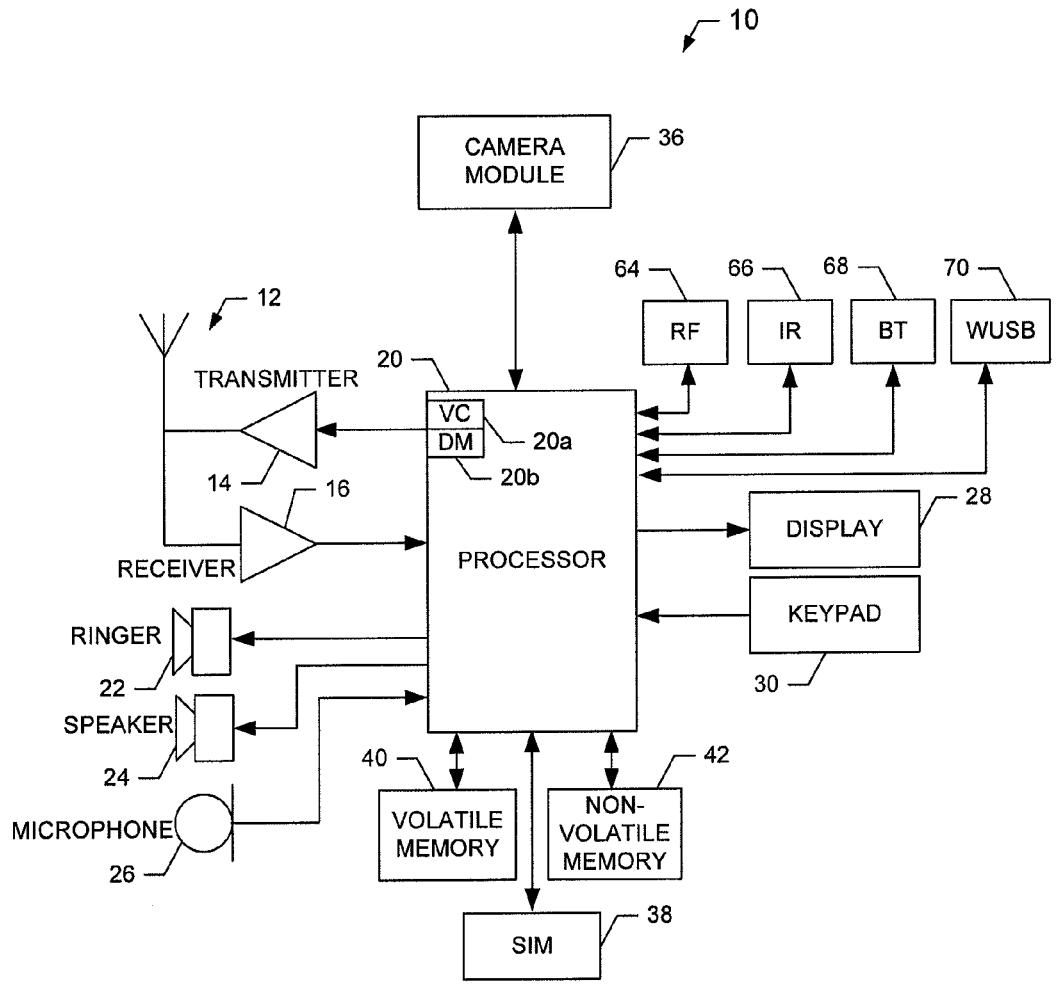
FIG. 2 is a schematic block diagram of a mobile terminal according to an example embodiment of the invention.

In an example embodiment, the terminal apparatus 102 is embodied as a mobile terminal, such as that illustrated in FIG. 2. In this regard, FIG. 2 illustrates a block diagram of a mobile terminal 10 representative of one embodiment of a terminal apparatus 102 in accordance with embodiments of the present invention. It should be understood, however, that the mobile terminal 10 illustrated and hereinafter described is merely illustrative of one type of terminal apparatus 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1 G), second generation (2 G), 2.5 G, third-generation (3 G) communication protocols, fourth-generation (4 G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5 G wireless communication protocols General Packet Radio Service (GPRS), Enhanced Data GSM Environment (EDGE), and/or the like. Further, for example, the mobile terminal may be capable of operating in accordance with 3 G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9 G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4 G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.15 techniques, IEEE 802.16 techniques, and/or the like.

In an example embodiment, the mobile terminal 10 may include a media capturing element, such as a camera, video and/or audio module, in communication with the processor 20. The media capturing element may be any means for capturing an image, video and/or audio for storage, display or transmission. For example, in an exemplary embodiment in which the media capturing element is a camera module 36, the camera module 36 may include a digital camera capable of forming a digital image file from a captured image. In addition, the digital camera of the camera module 36 may be capable of capturing a video clip. As such, the camera module 36 may include all hardware, such as a lens or other optical component(s), and software necessary for creating a digital image file from a captured image as well as a digital video file from a captured video clip. Alternatively, the camera module 36 may include only the hardware needed to view an image, while a memory device of the mobile terminal 10 stores instructions for execution by the processor 20 in the form of software necessary to create a digital image file from a captured image. As yet another alternative, an object or objects within a field of view of the camera module 36 may be displayed on the display 28 of the mobile terminal 10 to illustrate a view of an image currently displayed which may be captured if desired by the user. As such, as referred to hereinafter, an image may be either a captured image or an image comprising the object or objects currently displayed by the mobile terminal 10, but not necessarily captured in an image file. In an example embodiment, the camera module 36 may further include a processing element such as a co-processor which assists the processor 20 in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

The mobile terminal 10 may comprise memory, such as a subscriber identity module (SIM) 38, a universal subscriber identity module (USIM), a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
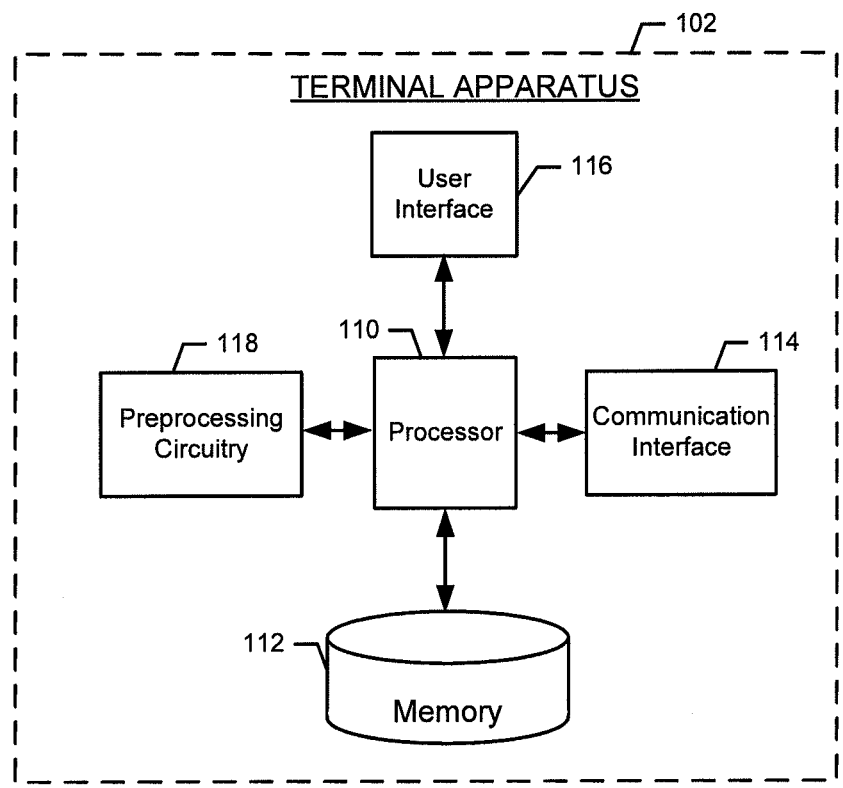
FIG. 3 illustrates a block diagram of a terminal apparatus for facilitating remote data processing according to an example embodiment of the invention.

Referring now to FIG. 3, FIG. 3 illustrates a block diagram of a terminal apparatus 102 for facilitating remote data processing according to an example embodiment of the invention. In the example embodiment illustrated in FIG. 3, the terminal apparatus 102 may include various means, such as a processor 110, memory 112, communication interface 114, user interface 116, and preprocessing circuitry 118 for performing the various functions herein described. These means of the terminal apparatus 102 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory 112) that is executable by a suitably configured processing device (for example, the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments the processor 110 comprises a plurality of processors. The plurality of processors may be in operative communication with each other and may be collectively configured to perform one or more functionalities of the terminal apparatus 102 as described herein. In embodiments wherein the terminal apparatus 102 is embodied as a mobile terminal 10, the processor 110 may be embodied as or comprise the processor 20. In an example embodiment, the processor 110 is configured to execute instructions stored in the memory 112 or otherwise accessible to the processor 110. These instructions, when executed by the processor 110, may cause the terminal apparatus 102 to perform one or more of the functionalities of the terminal apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. Although illustrated in FIG. 3 as a single memory, the memory 112 may comprise a plurality of memories. In various embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the terminal apparatus 102 is embodied as a mobile terminal 10, the memory 112 may comprise the volatile memory 40 and/or the non-volatile memory 42. The memory 112 may be configured to store information, data, applications, instructions, or the like for enabling the terminal apparatus 102 to carry out various functions in accordance with example embodiments of the present invention. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. This stored information may be stored and/or used by the preprocessing circuitry 118 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to an entity of the system 100, such as, for example, a data processing apparatus 104. In at least one embodiment, the communication interface 114 is at least partially embodied as or otherwise controlled by the processor 110. The communication interface 114 may, for example, be in communication with the processor 110, such as via a bus. The communication interface 114 may include, for example, an antenna, a transmitter, a receiver, a transceiver and/or supporting hardware or software for enabling communications with one or more entities of the system 100. The communication interface 114 may be configured to receive and/or transmit data using any protocol that may be used for communications between entities of the system 100. The communication interface 114 may additionally be in communication with the memory 112, user interface 116, and/or preprocessing circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. The user interface 116 may be in communication with the memory 112, communication interface 114, and/or preprocessing circuitry 118, such as via a bus.

The preprocessing circuitry 118 may be embodied as various means, such as circuitry, hardware, a computer program product comprising computer readable program instructions stored on a computer readable medium (for example, the memory 112) and executed by a processing device (for example, the processor 110), or some combination thereof and, in one embodiment, is embodied as or otherwise controlled by the processor 110. The preprocessing circuitry 118 may comprise and/or be in communication with a content capturing model, such as a digital camera or video recorder. In this regard, in embodiments wherein the terminal apparatus 102 is embodied as a mobile terminal 10, the preprocessing circuitry 118 may comprise and/or be in communication with the camera module 36. The preprocessing circuitry 118 may further comprise and/or be in communication with one or more context sensors such that the preprocessing circuitry 118 may receive context sensory data collected by the context sensors. The context sensors may comprise, for example, a positioning sensor, such as a GPS receiver. In embodiments wherein the preprocessing circuitry 118 is embodied separately from the processor 110, the preprocessing circuitry 118 may be in communication with the processor 110. The preprocessing circuitry 118 may further be in communication with one or more of the memory 112, communication interface 114, or user interface 116, such as via a bus.

Figure 4:
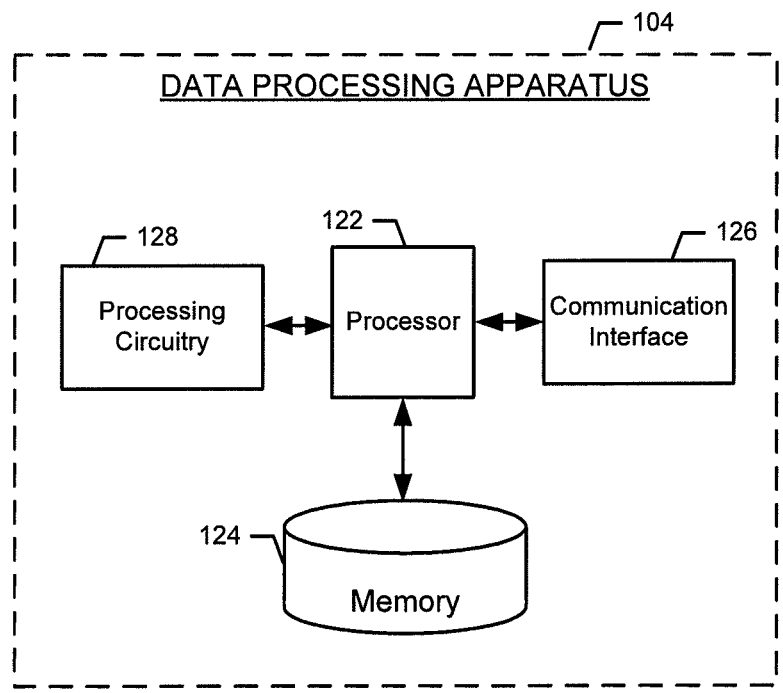
FIG. 4 illustrates a block diagram of a data processing apparatus for facilitating remote data processing according to an example embodiment of the invention.

FIG. 4 illustrates a block diagram of a data processing apparatus 104 for facilitating remote data processing according to an example embodiment of the invention. In the example embodiment illustrated in FIG. 4, the data processing apparatus 104 may include various means, such as a processor 122, memory 124, communication interface 126, and processing circuitry 128 for performing the various functions herein described. These means of the data processing apparatus 104 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory 124) that is executable by a suitably configured processing device (for example, the processor 122), or some combination thereof.

The processor 122 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments the processor 122 comprises a plurality of processors. The plurality of processors may be in operative communication with each other and may be collectively configured to perform one or more functionalities of the data processing apparatus 104 as described herein. The plurality of processors may be embodied on a single computing device or may be distributed across a plurality of computing devices collectively configured to perform one or more functionalities of the data processing apparatus 104 as described herein. In an example embodiment, the processor 122 is configured to execute instructions stored in the memory 124 or otherwise accessible to the processor 122. These instructions, when executed by the processor 122, may cause the data processing apparatus 104 to perform one or more of the functionalities of the data processing apparatus 104 as described herein. As such, whether configured by hardware or software methods, or by a combination thereof, the processor 122 may comprise an entity capable of performing operations according to embodiments of the present invention while configured accordingly. Thus, for example, when the processor 122 is embodied as an ASIC, FPGA or the like, the processor 122 may comprise specifically configured hardware for conducting one or more operations described herein. Alternatively, as another example, when the processor 122 is embodied as an executor of instructions, such as may be stored in the memory 124, the instructions may specifically configure the processor 122 to perform one or more algorithms and operations described herein.

The memory 124 may comprise, for example, volatile memory, non-volatile memory, or some combination thereof. Although illustrated in FIG. 4 as a single memory, the memory 124 may comprise a plurality of memories. The plurality of memories may be embodied on a single computing device or distributed across a plurality of computing devices that may collectively comprise the data processing apparatus 104. In various embodiments, the memory 124 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 124 may be configured to store information, data, applications, instructions, or the like for enabling the data processing apparatus 104 to carry out various functions in accordance with various example embodiments. For example, in at least some embodiments, the memory 124 is configured to buffer input data for processing by the processor 122. Additionally or alternatively, in at least some embodiments, the memory 124 is configured to store program instructions for execution by the processor 122. The memory 124 may store information in the form of static and/or dynamic information. This stored information may be stored and/or used by processing circuitry 128 during the course of performing its functionalities.

The communication interface 126 may be embodied as any device or means embodied in circuitry, hardware, a computer program product comprising computer readable program instructions stored on a computer readable medium (for example, the memory 124) and executed by a processing device (for example, the processor 122), or a combination thereof that is configured to receive and/or transmit data from/to an entity of the system 100, such as, for example, a terminal apparatus 102. In at least one embodiment, the communication interface 126 is at least partially embodied as or otherwise controlled by the processor 122. In this regard, the communication interface 126 may be in communication with the processor 122, such as via a bus. The communication interface 126 may include, for example, an antenna, a transmitter, a receiver, a transceiver and/or supporting hardware or software for enabling communications with one or more entities of the system 100. The communication interface 126 may be configured to receive and/or transmit data using any protocol that may be used for communications between entities of the system 100 over the network 106. The communication interface 126 may additionally be in communication with the memory 124 and/or processing circuitry 128, such as via a bus.

The processing circuitry 128 may be embodied as various means, such as circuitry, hardware, a computer program product comprising computer readable program instructions stored on a computer readable medium (for example, the memory 124) and executed by a processing device (for example, the processor 122), or some combination thereof and, in one embodiment, is embodied as or otherwise controlled by the processor 122. In embodiments wherein the processing circuitry 128 is embodied separately from the processor 122, the processing circuitry 128 may be in communication with the processor 122. The processing circuitry 128 may further be in communication with the memory 124 and/or communication interface 126, such as via a bus.

In example embodiments, the preprocessing circuitry 118 is configured to access content represented by data. The accessed content may, for example, be stored on the memory 112. As another example, the preprocessing circuitry 118 may be configured to access content as it is captured, such as by a camera apparatus (e.g., the camera module 36), video recorder apparatus, audio capture apparatus (e.g., a microphone), and/or the like that is embodied on or otherwise in communication with the terminal apparatus 102. It will be appreciated that the content may comprise any kind of content. In some embodiments the content comprises multimedia content, such as, for example, image content, video content, audio content, and/or the like.

The preprocessing circuitry 118 may be further configured to preprocess the data representing the content to generate reduced data. In this regard, the reduced data is still representative of the accessed content, but is smaller in size than the original data. In some embodiments, the original data is not recoverable from the reduced data. In this regard, the preprocessing circuitry 118 may preprocess the original data to generate reduced data having a form that is tailored for processing, such as by the data processing apparatus 104 to derive data related to the content rather than enabling the data processing apparatus 104 to recover the original data itself.

The preprocessing circuitry 118 may preprocess data using any appropriate scheme or algorithm suitable for reducing the size of the data. As an example, if the accessed content comprises image data having a first resolution, the preprocessing circuitry 118 may be configured to preprocess the image data to generate reduced image data having a reduced resolution. As another example, if the accessed content comprises video data having a first frame rate, the preprocessing circuitry 118 may be configured to preprocess the video data to generate reduced video data having a reduced frame rate. The preprocessing circuitry 118 may additionally or alternatively be configured to preprocess data by applying a compression scheme to the data so as to reduce the data size. It will be appreciated, however, that the above example method of reducing data size are provided merely by way of example and not by way of limitation. Accordingly, the preprocessing circuitry 118 may be configured to preprocess data so as to reduce data size in accordance with any appropriate data size reduction method.

In some example embodiments the preprocessing circuitry 118 is configured to determine a reduction scheme and preprocess data based at least in part on the determined reduction scheme. The preprocessing circuitry 118 may be configured to determine a reduction scheme based on any one or more of a number of factors. One example factor is the type of content represented by data to be preprocessed. For example, the preprocessing circuitry 118 may apply a different reduction scheme to video content (e.g., reduce frame rate) than to image content (e.g., reduce resolution). The preprocessing circuitry 118 may additionally or alternatively be configured to determine a reduction scheme based at least in part upon one or more of available computational capacity, remaining battery life of a battery powering the terminal apparatus 102, conditions of the network 106, available bandwidth over a communication channel (e.g., over the network 106) between the terminal apparatus 102 and data processing apparatus 104, user-defined data reduction settings, and/or the like. For example, if one or more processing intensive tasks in addition to data preprocessing is being executed on the terminal apparatus, the preprocessing circuitry 118 may be configured to perform a lesser degree of preprocessing and/or use a less processing intensive reduction scheme to preprocess data. As another example, if network conditions are particularly congested, the preprocessing circuitry 118 may be configured to preprocess data using a reduction scheme that results in a greater reduction in data size so that transmitting the reduced data requires less network bandwidth than reduced data generated using a reduction scheme used when network conditions are not congested. As a further example, in embodiments wherein the terminal apparatus 102 is powered by a battery and the battery life is below a predefined threshold, the preprocessing circuitry 118 may be configured to determine a reduction scheme that balances the power required to transmit reduced data to the data processing apparatus with the power required to preprocess the data so as to preserve battery life.

In another example, the terminal apparatus 102 may be in communication with the data processing apparatus 104 via a cellular network operated by a network operator which charges varying data transfer rates, such as a higher rate during peak network hours and a lower rate during off peak hours. Accordingly, the preprocessing circuitry 118 may be configured to determine a reduction scheme based on a network data transfer charge rate. Thus, the preprocessing circuitry 118 may be configured to use a reduction scheme that reduces data size to a greater extent during peak hours than a reduction scheme used during off peak hours when data transfer charges are cheaper. Similarly, the preprocessing circuitry 118 may be configured to determine a data reduction scheme based on a network access type used by the terminal apparatus 102 to access the network 106. For example, a user of the terminal apparatus 102 may be charged for data transfer via a cellular access, but may not be charged for data transfer when the terminal apparatus 102 is connected to the network 106 via an unlicensed access (e.g., a wireless local area network access). Accordingly, the preprocessing circuitry 118 may be configured to use a reduction scheme that reduces data size to a greater extent when the terminal apparatus 102 is connected via a cellular access than a reduction scheme used when the terminal apparatus 102 is connected via an unlicensed access.

The preprocessing circuitry 118 may be further configured to cause reduced data to be sent to the data processing apparatus 104 to enable the data processing apparatus 104 to derive data related to the content represented by the reduced data. The processing circuitry 128 may be configured to receive reduced data sent by a terminal apparatus 102 and process the reduced data to derive data related to the content represented by the reduced data. In this regard, the processing circuitry 128 may be configured to analyze or otherwise process the reduced data to derive further data that is descriptive in some manner of the content. As one example, the processing circuitry 128 may be configured to process the reduced data to generate metadata related to and/or descriptive of the content represented by the reduced data.

As another example, the processing circuitry 128 may be configured to process the reduced data to identify one or more objects contained within the content. For example, when the content comprises an image, video, and/or the like, the processing circuitry 128 may be configured to identify a landmark (e.g., a building) depicted in the content. The processing circuitry 128 may be further configured to access additional information about the identified object(s). For example, if the processing circuitry 128 identifies an object contained within the content as the Eiffel Tower, the processing circuitry 128 may be configured to access information about the history of the Eiffel Tower, information for tourists visiting the Eiffel Tower, and/or the like.

As a further example, the processing circuitry 128 may be configured to identify a face depicted in the content. Accordingly, the processing circuitry 128 may derive data identifying individuals depicted in the content. If the content comprises a video, a plurality of photos, or the like, the processing circuitry 128 may be configured to derive data defining how many times a particular individual's face appears in the content. The derived data may further comprise links to video frames, video segments, images, and/or the like in which the individual's face appears.

The processing circuitry 128 may, in some embodiments, store the derived data to the memory 124 such that it is associated with the content. For example, where the derived data comprises generated metadata, such embodiments may enable the metadata to be used for online content searching by users of one or more terminal apparatuses 102.

Additionally or alternatively, the processing circuitry 128 may be configured to cause the data processing apparatus 104 to transmit derived data to the terminal apparatus 102 so that it can be used by the terminal apparatus 102 and/or by a user of the terminal apparatus 102. The preprocessing circuitry 118 may accordingly be configured to receive data derived by the data processing apparatus 104. Where the derived data comprises metadata, the preprocessing circuitry 118 may associate the metadata with locally stored or accessible content. The metadata may accordingly facilitate organization, searching, or other usage of the locally stored content. As another example, where the derived data comprises an identity of one or more objects contained within the content and/or information about an identified object(s) contained within the content, the preprocessing circuitry 118 may be configured to provide the derived data to a user. If, for example, the derived data comprises information about the Eiffel Tower as in the previous example, the user may, for example, use the derived data to plan a visit to the Eiffel Tower. As another example, the user may utilize the derived data to view only relevant images or relevant video clips contained within the content (e.g., those portions of the content that contain an object, such as a face, of interest to the user.

In some example embodiments, the processing circuitry 128 is configured to cause the data processing apparatus 104 to send reduction control signaling to the terminal apparatus 102. The reduction control signaling may comprise one or more data reduction settings. In this regard, the processing circuitry 128 may be configured to influence the data reduction scheme used by the preprocessing circuitry 118 to preprocess data. Accordingly, the preprocessing circuitry 118 may be configured to determine a data reduction scheme to use based at least in part upon a data reduction setting(s) included in reduction control signaling received from the data processing apparatus 104. The processing circuitry 128 may be configured to determine a data reduction setting for signaling to the terminal apparatus 102 based on network conditions, processing load of the data processing apparatus 104, analysis of data received from the terminal apparatus 102, and/or the like. For example, if the data processing apparatus 104 is heavily burdened with data processing requests from multiple terminal apparatuses 102, the processing circuitry 128 may be configured to signal the terminal apparatus 102 to use a data reduction setting resulting in greater reduction in data size. As another example, if in processing received data, the processing circuitry 128 determines that a greater amount of data is needed to generate metadata the processing circuitry 128 may be configured to signal the terminal apparatus 102 to use a data reduction setting resulting in less reduction in data size.

The processing circuitry 128 may be configured to determine when a higher quality representation of content is needed for generation of metadata and, in response to the determination, to request the terminal apparatus 102 to send a higher quality representation of the content. For example, the processing circuitry 128 may need higher resolution image data to recognize facial features illustrated in the image. The preprocessing circuitry 118 may be configured to receive such a request from the data processing apparatus 104. In response to receipt of a request for a higher quality representation of content, the preprocessing circuitry 118 may generate reprocessed data having a higher quality than the reduced data previously sent to the data processing apparatus 104. For example, the preprocessing circuitry 118 may generate reprocessed data representing image content and having a higher resolution than reduced data previously sent to the data processing apparatus 104. In this regard, the reprocessed data may have a larger data size than the reduced data previously sent to the data processing apparatus 104 and may comprise the originally accessed data representing the content.

Figure 5:
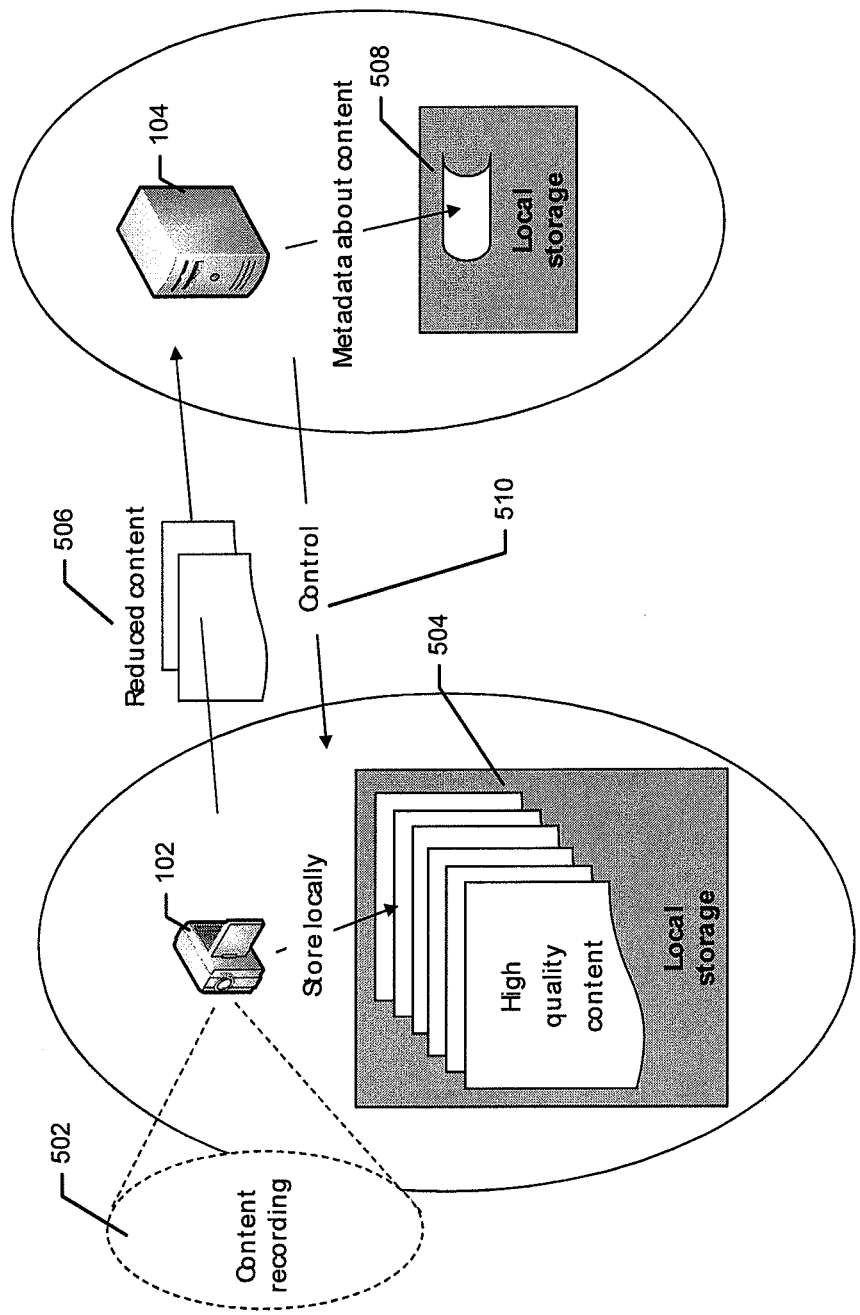
FIG. 5 illustrates a system for facilitating remote data processing according to an example embodiment of the invention.

FIG. 5 illustrates a system for facilitating remote data processing according to an example embodiment of the invention. The terminal apparatus 102 may capture content 502. The content may comprise high quality content 504 represented by a large amount of data, which may be locally stored in the terminal apparatus 102. The preprocessing circuitry 118 may generate reduced data content 506 and send the reduced data content 506 to the data processing apparatus 104. The processing circuitry 128 may receive the reduced data content 506 and process the data to generate metadata 508 about the content. The processing circuitry 128 may store the metadata 508 locally such that it is associated with the high quality content 504 stored at the terminal apparatus 102 or may send the metadata 508 to the terminal apparatus 102 so that the preprocessing circuitry 118 may locally store and associate the metadata 508 with the high quality content 504. The processing circuitry 128 may additionally send reduction control signaling 510 to the terminal apparatus 102 to influence a reduction scheme used by the preprocessing circuitry 118 to preprocess the high quality content data. The reduction control signaling 510 may be sent to the terminal apparatus 102 at the initiation of a communication session to configure a reduction scheme at the outset and/or may be sent during a session to enable adaptation of the reduction scheme in response to changing conditions.

Figure 6:
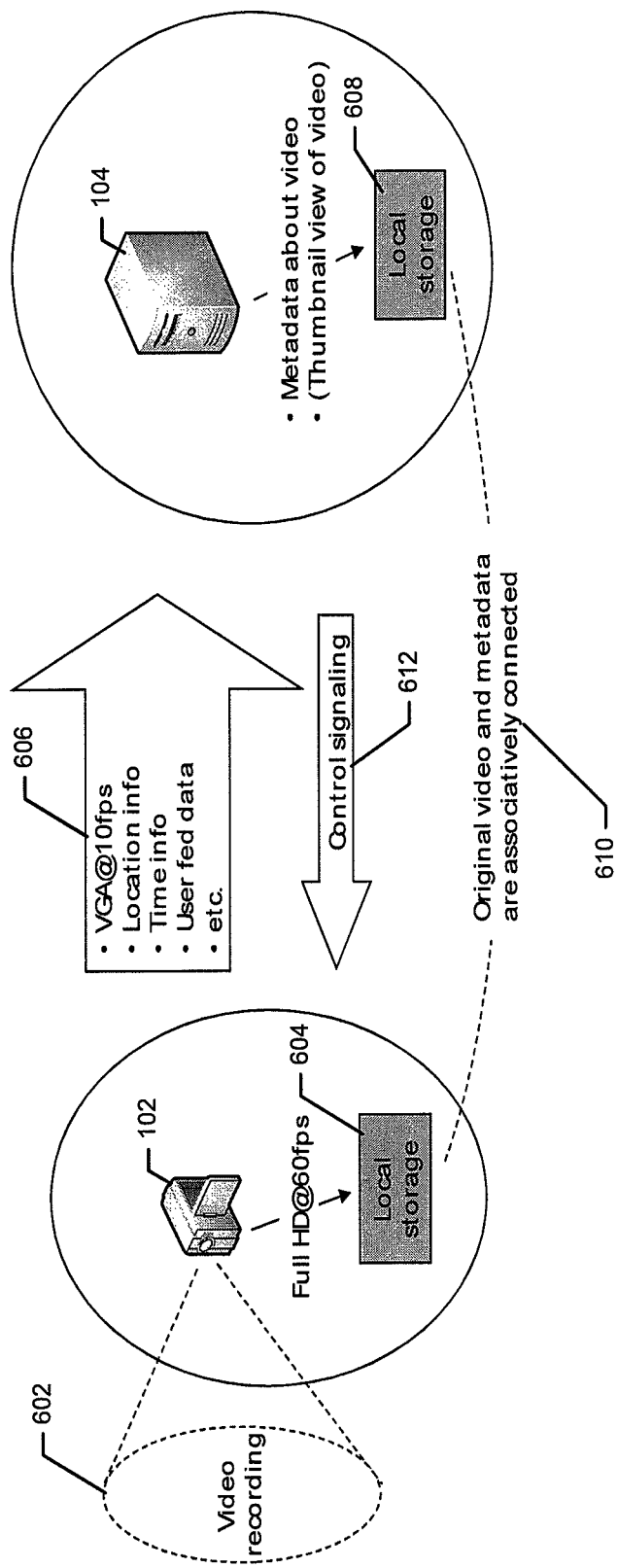
FIG. 6 illustrates a system for facilitating remote data processing according to an example embodiment of the invention.

FIG. 6 illustrates a system for facilitating remote data processing according to an example embodiment of the invention. In the example illustrated in FIG. 6, the terminal apparatus 102 may capture video content 602 having a high definition (HD) frame rate of 60 frames per second (FPS). The HD video content may be stored in a local storage 604. The preprocessing circuitry 118 may be configured to generate reduced data by reducing the video content to Video Graphics Array (VGA) quality having 10 frames per second. The preprocessing circuitry 118 may reduce color components from the original video content 602 and/or may use one or more compression schemes to further reduce the size of the video content. The compression scheme(s) used by the preprocessing circuitry may be more lossy than compression schemes generally used to generate compressed data for human use and the original captured video content 602 may not be recoverable from the reduced video content. The preprocessing circuitry 118 may send the reduced video content as well as other data to the data processing apparatus 104 via signaling 606. The other data sent to the data processing apparatus 104 may comprise context sensory data related to the content that may be used by the processing circuitry 128 to generate additional metadata. For example, the context sensory data may comprise location information indicating a location of the terminal apparatus 102 when the video was captured. As another example, the context sensory data may comprise time information indicating a time when the video was captured. The data sent to the data processing apparatus 104 may additionally comprise user entered data about the content that may be used for metadata generation. The processing circuitry 128 may receive the data contained in the signaling 606 and generate metadata associated with the content by processing the received data. The generated metadata 608 may be stored in a memory local to the data processing apparatus 104 (e.g., the memory 124) in a manner that an association 610 between the HD video content stored at the terminal apparatus 102 and the metadata 608 is reflected. It will be appreciated, however, that the processing circuitry 128 may alternatively send the generated metadata 608 to the terminal apparatus 102 so that the metadata can be stored locally at the terminal apparatus 102 in association with the HD video content. In some embodiments the processing circuitry 128 may store the reduced video content locally to provide a thumbnail view of the video that may be used by users previewing the video content. As another example, were the captured content image content, the processing circuitry 128 may locally store reduced content as a thumbnail reference image of the content. The processing circuitry 128 may send reduction control signaling 612 to the terminal apparatus 102. The reduction control signaling 612 may be generated and used in a manner similar to the reduction control signaling 510 described with respect to FIG. 5.

Figure 7:
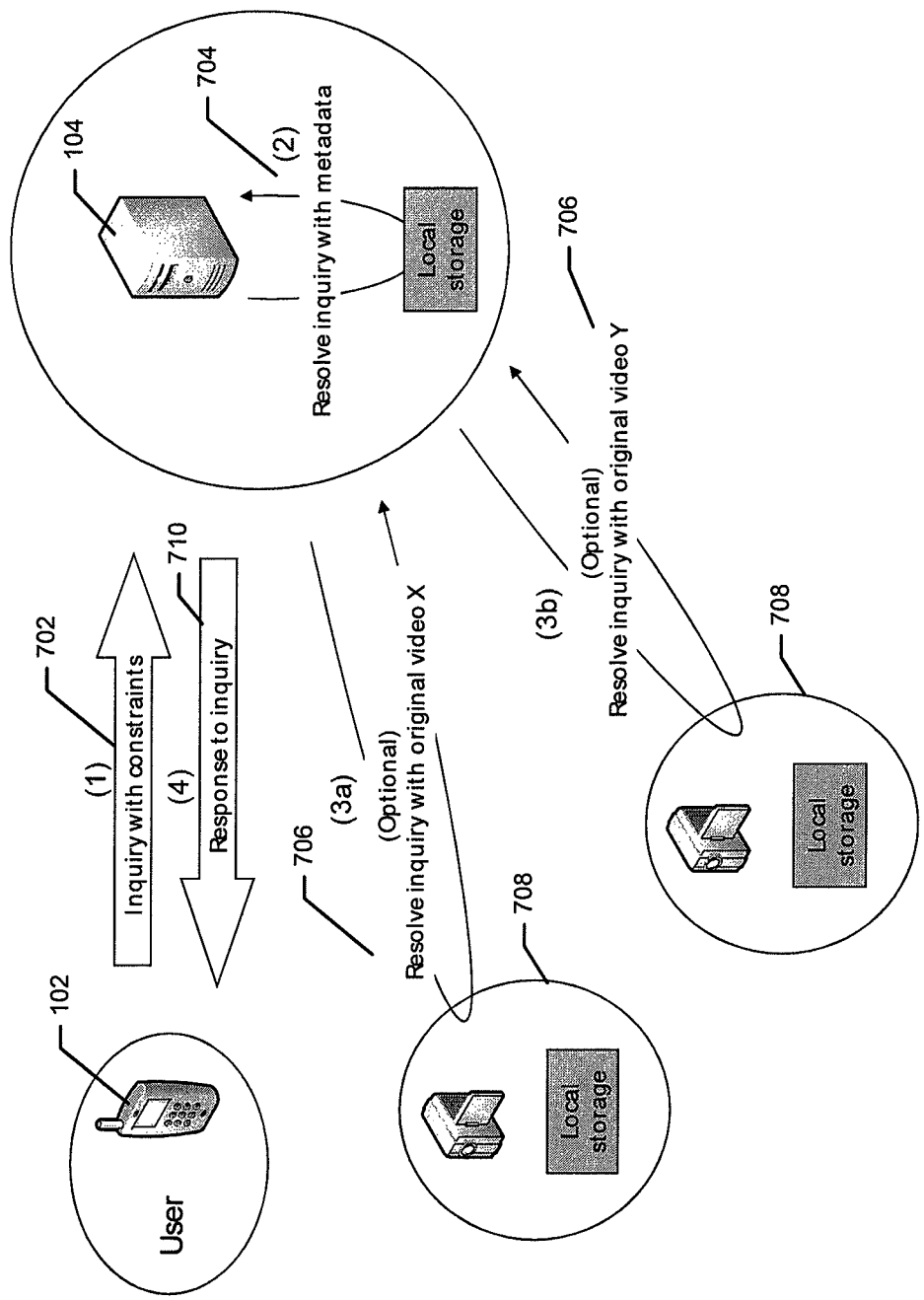
FIG. 7 illustrates a system for using metadata to search for content according to an example embodiment of the invention.

FIG. 7 illustrates a system for using metadata to search for content according to an example embodiment of the invention. The system illustrated in FIG. 7 comprises a terminal apparatus 102, data processing apparatus 104, and a plurality of computing devices 708. The computing devices 708 may each have locally stored content. The data processing apparatus 104 may have locally stored metadata associated with the content stored in the computing devices 708. The terminal apparatus 102 may send a content inquiry 702 including constraints (e.g., search parameters) constraining the type of content the user of the terminal apparatus 102 is looking for. The processing circuitry 128 may receive the inquiry 702 and may resolve the inquiry by searching the metadata 704 for content matching the constraints of the inquiry. The processing circuitry 128 may optionally resolve the inquiry 702 by locating the actual content (e.g., the original video "X" and/or the original video "Y") stored at the computing devices 708 satisfying the inquiry. The processing circuitry 128 may further send a response 710 to the inquiry to the terminal apparatus 102. The response may comprise a resolution to the metadata such that the user of the terminal apparatus 102 may review the metadata and access the content stored at the computing devices 708 that satisfies the inquiry. Additionally or alternatively the response may comprise a direct resolution to the content stored at the computing devices 708 that satisfies the inquiry.

Figure 8:
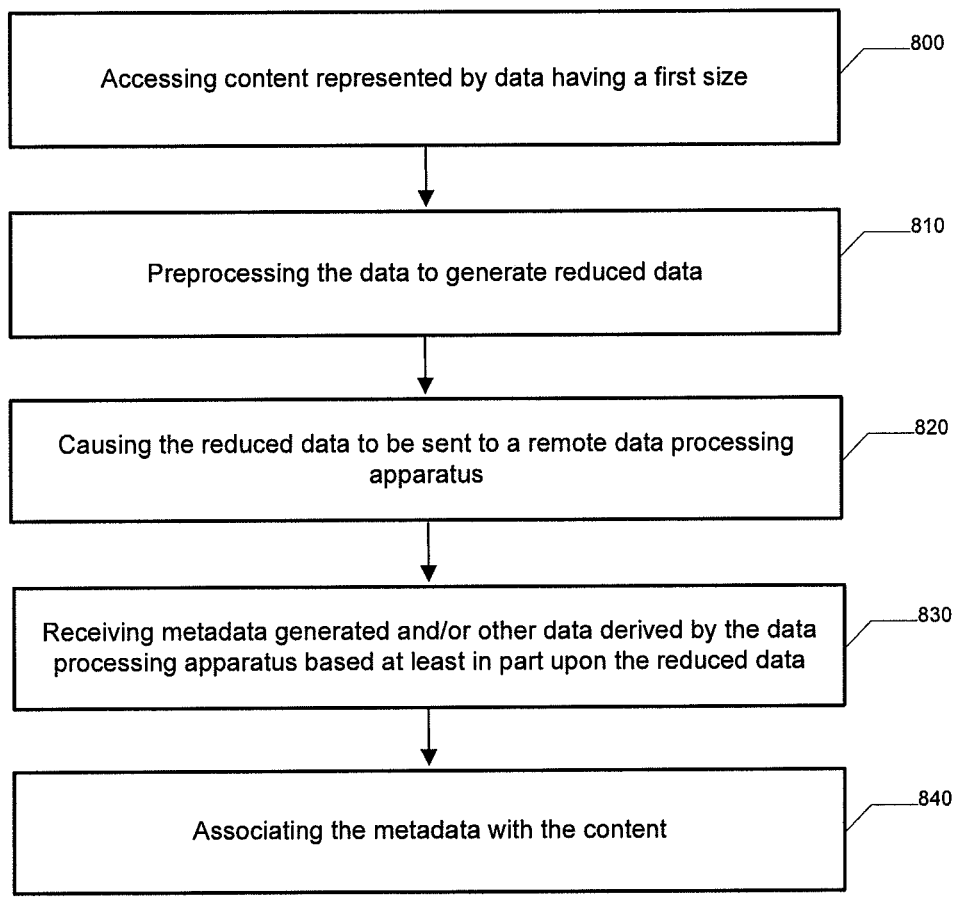
FIG. 8 illustrates a flowchart according to an example method for facilitating remote data processing according to an example embodiment of the invention.

FIG. 8 illustrates a flowchart according to an example method for facilitating remote data processing according to an example embodiment of the invention. In this regard, FIG. 8 illustrates operations that may, for example, be performed at the terminal apparatus 102. The operations illustrated in and described with respect to FIG. 8 may, for example, be performed by and/or under control of one or more of the processor 110, memory 112, communication interface 114, user interface 116, or preprocessing circuitry 118. Operation 800 may comprise accessing content represented by data having a first size. Operation 810 may comprise preprocessing the data to generate reduced data. Operation 820 may comprise causing the reduced data to be sent to a remote data processing apparatus.

Operations 830 and 840 illustrated in FIG. 8 are illustrated for purposes of example, but may not be performed in some embodiments. Operation 830 may comprise receiving metadata generated by the data processing apparatus and/or other data derived by the data processing apparatus based at least in part upon the reduced data. Operation 840 may comprise associating the metadata with the content.

Figure 9:
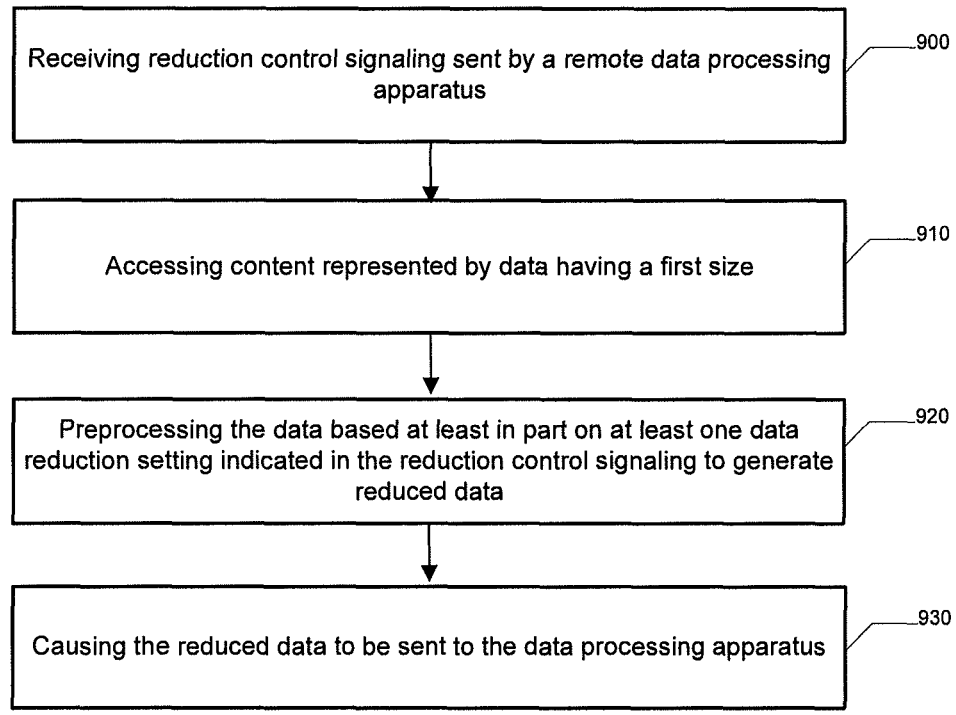
FIG. 9 illustrates a flowchart according to an example method for facilitating remote data processing according to an example embodiment of the invention.

FIG. 9 illustrates a flowchart according to an example method for facilitating remote data processing according to an example embodiment of the invention. In this regard, FIG. 9 illustrates operations that may, for example, be performed at the terminal apparatus 102. The operations illustrated in and described with respect to FIG. 9 may, for example, be performed by and/or under control of one or more of the processor 110, memory 112, communication interface 114, user interface 116, or preprocessing circuitry 118. Operation 900 may comprise receiving reduction control signaling sent by a remote data processing apparatus. Operation 910 may comprise accessing content represented by data having a first size. Operation 920 may comprise preprocessing the data based at least in part on at least one data reduction setting indicated in the reduction control signaling to generate reduced data. Operation 930 may comprise causing the reduced data to be sent to the data processing apparatus.

Figure 10:
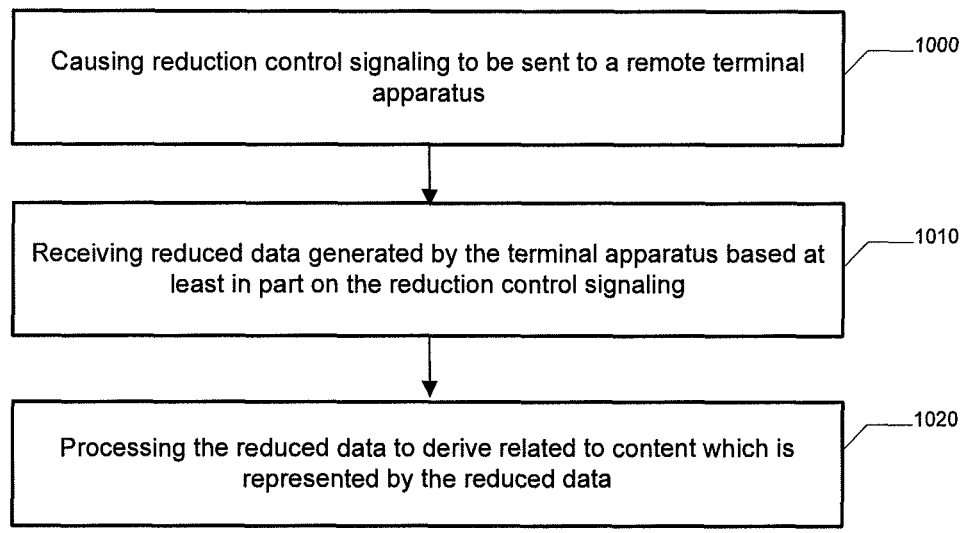
FIG. 10 illustrates a flowchart according to an example method for facilitating remote data processing according to an example embodiment of the invention.

FIG. 10 illustrates a flowchart according to an example method for facilitating remote data processing according to an example embodiment of the invention. In this regard, FIG. 10 illustrates operations that may, for example, be performed at the data processing apparatus 104. The operations illustrated in and described with respect to FIG. 10 may, for example, be performed by and/or under control of one or more of the processor 122, memory 124, communication interface 126, or processing circuitry 128. Operation 1000 may comprise causing reduction control signaling to be sent to a remote terminal apparatus. Operation 1010 may comprise receiving reduced data generated by the terminal apparatus based at least in part on the reduction control signaling. Operation 1020 may comprise processing the reduced data to derive data related to content which is represented by the reduced data.

FIGS. 8-10 are flowcharts of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories (e.g., memory 112 and/or memory 124) on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, terminal apparatus 102 and/or data processing apparatus 104) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (e.g., the processor 110 and/or processor 122) may provide all or a portion of the elements. In another embodiment, all or a portion of the elements may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices and computing device users. Some example embodiments provide for remote data processing. In this regard, some example embodiments facilitate remote data processing of data content such that information about the content may be mined from the content. In this regard data representing content may be sent to a data processing apparatus that is remote from a device capturing the content. Accordingly, potentially burdensome processing of the data may be offloaded to an apparatus specially configured to process data rather than requiring the data processing to be performed at a user's device, which may have relatively limited processing capabilities. Some example embodiments provide for reduction of data size prior to transferring the data to a data processing apparatus. Accordingly, any burden imposed on network resources by transfer of data for remote processing may be reduced as less throughput is required to transfer data having a reduced size. Additionally, hardware and/or software configured for data processing may be centralized at a single location and leveraged by a plurality of users rather than requiring each user to have specially configured hardware and/or software on their own computing device.

Some example embodiments facilitate remote generation of metadata that may provide information about content and facilitate organization, distribution, and usage of the content. Some example embodiments additionally or alternatively provide for remote processing of data representing content to identify objects contained within the content. For example, such example embodiments may provide for remote data processing to identify a face or other object depicted in an image defined by the content.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method for use in a terminal device, the method comprising:
    accessing content represented by data having a first size;
    preprocessing, by preprocessing circuitry, the data to generate reduced data having a second size being smaller than the first size and having one or more of a reduced frame rate or a reduced resolution;
    causing the reduced data to be sent to a remote data processing apparatus configured to process the reduced data to derive data related to the content;
    receiving metadata generated by the remote data processing apparatus based at least in part upon the reduced data; and
    causing storage of the received metadata in association with the data having the first size.

2. The method of claim 1, wherein:
    accessing content comprises accessing multimedia content represented by data having one or more of a first frame rate or a first resolution.

3. The method of claim 1, further comprising determining a reduction scheme; and wherein preprocessing the data comprises preprocessing the data based at least in part on the reduction scheme.

4. The method of claim 3, wherein determining the reduction scheme comprises determining the reduction scheme based at least in part on one or more of a computational capacity, remaining battery life, network conditions, available network bandwidth over a communication channel with the data processing apparatus, user-defined data reduction settings, a type of the content, a data transfer charge rate, a network access type, or reduction control signaling received from the data processing apparatus.

5. The method of claim 1, further comprising:
    receiving reduction control signaling sent by the data processing apparatus, the reduction control signaling indicating at least one data reduction setting; and
    wherein preprocessing the data comprises preprocessing the data in accordance with the at least one data reduction setting.

6. The method of claim 1, further comprising:
    receiving a request from the data processing apparatus for a higher quality representation of at least a portion of the content;
    preprocessing data representing the requested at least a portion of the content a second time to generate reprocessed data having a higher quality than the reduced data; and
    causing the reprocessed data to be sent to the remote data processing apparatus for analysis.

7. The method of claim 1, wherein the remote data processing apparatus is configured to process the reduced data to generate metadata related to the content.

8. The method of claim 1, further comprising:
associating the received metadata with the content.

9. The method of claim 1, wherein the remote data processing apparatus is configured to process the reduced data to identify one or more objects contained within the content.

10. The method of claim 1, wherein the data having the first size is not recoverable from the reduced data.

11. An apparatus comprising at least one processor and at least one memory storing computer program code, wherein the at least one memory and stored computer program code are configured, with the at least one processor, to cause the apparatus to at least:
access content represented by data having a first size;
preprocess the data to generate reduced data having a second size being smaller than the first size and having one or more of a reduced frame rate or a reduced resolution;
cause the reduced data to be sent to a remote data processing apparatus configured to process the reduced data to derive data related to the content;
receive metadata generated by the remote data processing apparatus based at least in part upon the reduced data; and
causing storage of the received metadata in association with the data having the first size.

12. The apparatus of claim 11, wherein the at least one memory and stored computer program code are configured, with the at least one processor, to cause the apparatus to:
access content by accessing multimedia content represented by data having one or more of a first frame rate or a first resolution.

13. The apparatus of claim 11, wherein the at least one memory and stored computer program code are configured, with the at least one processor, to further cause the apparatus to determine a reduction scheme; and wherein the at least one memory and stored computer program code are configured, with the at least one processor, to cause the apparatus to preprocess the data by preprocessing the data based at least in part on the reduction scheme.

14. The apparatus of claim 13, wherein the at least one memory and stored computer program code are configured, with the at least one processor, to cause the apparatus to determine the reduction scheme based at least in part on one or more of a computational capacity, remaining battery life, network conditions, available network bandwidth over a communication channel with the data processing apparatus, user-defined data reduction settings, a type of the content, a data transfer charge rate, a network access type, or reduction control signaling received from the data processing apparatus.

15. The apparatus of claim 11, wherein the at least one memory and stored computer program code are configured, with the at least one processor, to further cause the apparatus to:
receive reduction control signaling sent by the data processing apparatus, the reduction control signaling indicating at least one data reduction setting; and
wherein the at least one memory and stored computer program code are configured, with the at least one processor, to cause the apparatus to preprocess the data by preprocessing the data in accordance with the at least one data reduction setting.

16. The apparatus of claim 11, wherein the at least one memory and stored computer program code are configured, with the at least one processor, to further cause the apparatus to:
receive a request from the data processing apparatus for a higher quality representation of at least a portion of the content;
preprocess data representing the requested at least a portion of the content a second time to generate reprocessed data having a higher quality than the reduced data; and
cause the reprocessed data to be sent to the remote data processing apparatus for analysis.

17. The apparatus of claim 11, wherein the remote data processing apparatus is configured to process the reduced data to generate metadata related to the content, and wherein the at least one memory and stored computer program code are configured, with the at least one processor, to cause the apparatus to:
associate the received metadata with the content.

18. The apparatus of claim 11, wherein the remote data processing apparatus is configured to process the reduced data to identify one or more objects contained within the content.

19. The apparatus of claim 11, wherein the data having the first size is not recoverable from the reduced data.

20. The apparatus of claim 11, wherein the apparatus comprises or is embodied on a mobile phone, the mobile phone comprising user interface circuitry and user interface software stored on one or more of the at least one memory; wherein the user interface circuitry and user interface software are configured to:
facilitate user control of at least some functions of the mobile phone through use of a display; and
cause at least a portion of a user interface of the mobile phone to be displayed on the display to facilitate user control of at least some functions of the mobile phone.

21. A method for use in a data processing device, the method comprising:
receiving reduced data representative of content, wherein the reduced data comprises data generated by a remote terminal apparatus by preprocessing data having a larger size than the reduced data;
processing the reduced data, by processing circuitry, to derive data related to the content;
generating metadata related to the content; and
causing the metadata to be sent to the remote terminal apparatus and stored in association with the data having the first size.

22. The method of claim 21, further comprising:
causing reduction control signaling to be sent to the terminal apparatus, the reduction control signaling indicating at least one data reduction setting; and
wherein the reduced data was generated by the terminal apparatus in accordance with the at least one data reduction setting.

23. The method of claim 21, wherein processing the reduced data comprises processing the reduced data to identify one or more objects contained within the content.

24. The method of claim 21, wherein the data preprocessed by the terminal apparatus is not recoverable from the reduced data.

25. An apparatus comprising at least one processor and at least one memory storing computer program code, wherein the at least one memory and stored computer program code are configured, with the at least one processor, to cause the apparatus to at least:

receive reduced data representative of content, wherein the reduced data comprises data generated by a remote terminal apparatus by preprocessing data having a larger size than the reduced data;

process the reduced data to derive data related to the content;

generate metadata related to the content; and cause the metadata to be sent to the remote terminal apparatus and stored in association with the data having the first size.

26. The apparatus of claim 25, wherein the at least one memory and stored computer program code are configured, with the at least one processor, to further cause the apparatus to:

cause reduction control signaling to be sent to the terminal apparatus, the reduction control signaling indicating at least one data reduction setting; and wherein the reduced data was generated by the terminal apparatus in accordance with the at least one data reduction setting.

27. The apparatus of claim 25, wherein the at least one memory and stored computer program code are configured, with the at least one processor, to cause the apparatus to process the reduced data to identify one or more objects contained within the content.

28. The apparatus of claim 25, wherein the data preprocessed by the terminal apparatus is not recoverable from the reduced data.

* * * * *